United States Patent [19]

Szostak

[11] Patent Number: 4,815,809

[45] Date of Patent: Mar. 28, 1989

[54] METHOD AND APPARATUS FOR TERMINATING AN OPTICAL FIBER

[75] Inventor: Tadeusz Szostak, Annandale, N.J.

[73] Assignee: Robert M. Rodrick, Bridgewater, N.J.

[21] Appl. No.: 80,137

[22] Filed: Jul. 31, 1987

[51] Int. Cl.$^4$ ................................................ G02B 6/36
[52] U.S. Cl. ................................................ 350/96.20
[58] Field of Search ............... 350/96.20, 96.21, 96.22

[56] References Cited

U.S. PATENT DOCUMENTS

| | | | |
|---|---|---|---|
| 2,608,722 | 9/1952 | Stuetzer | 264/1 |
| 3,244,776 | 4/1966 | Sheldon | 264/1 |
| 3,255,280 | 6/1966 | Burrowes | 264/1 |
| 3,504,060 | 3/1970 | Gardner | 264/1 |
| 4,026,972 | 5/1977 | Phillips et al. | 264/1 |
| 4,043,026 | 8/1977 | Weidhaas et al. | 29/592 |
| 4,090,778 | 5/1978 | Phillips et al. | 350/96.20 |
| 4,107,242 | 8/1978 | Runge | 264/1 |
| 4,173,389 | 11/1979 | Curtis | 350/96.20 |
| 4,186,999 | 2/1980 | Harwood et al. | 350/96.21 |
| 4,292,260 | 9/1981 | Cheung | 264/1.5 |
| 4,390,237 | 6/1983 | Marazzi | 350/96.20 |
| 4,681,398 | 7/1987 | Bailey et al. | 350/96.20 |
| 4,722,584 | 2/1988 | Kakii et al. | 350/96.20 |
| 4,729,624 | 3/1988 | Kakii et al. | 350/96.20 |
| 4,738,507 | 4/1988 | Palmquist | 350/96.21 |
| 4,738,508 | 4/1988 | Palmquist | 350/96.21 |
| 4,743,084 | 5/1988 | Manning | 350/96.21 |

FOREIGN PATENT DOCUMENTS 0118433 7/1984 Japan ................................. 264/1.5
1448180 9/1976 United Kingdom .

OTHER PUBLICATIONS

Miller, Calvin M.; Optical Fiber Splices and Connectors, copyright 1986, AT&T Bell Labs.—Chpt. 6, pp. 249–309.
Kurata et al.; An Optical Fiber Connector of Physical Contact Using a Glass Capillary—undated—pp. 19–22.
NEC-PC Single Mode Connector, undated, pp. 5–6, 12–13.
Lightguide-Splicing, undated.

*Primary Examiner*—William L. Sikes
*Assistant Examiner*—Frank González
*Attorney, Agent, or Firm*—Robert M. Rodrick; Salvatore J. Abbruzzese

[57] ABSTRACT

A method and apparatus for supporting an optical fiber in a ferrule assembly is disclosed. The ferrule assembly includes an elongate ferrule body having a fiber insertion end, a fiber egressing end and an elongate bore therebetween. A fiber capillary is supported in the bore of the body having a precision aperture therethrough which accommodates the optical fiber. The capillary includes a first end extent which extends beyond the egressing end of the ferrule body so that the optical fiber and the capillary may be polished to form a uniform flat end surface extending beyond the ferrule end.

10 Claims, 2 Drawing Sheets

METHOD AND APPARATUS FOR TERMINATING AN OPTICAL FIBER

FIELD OF THE INVENTION

This invention relates generally to a method and apparatus for terminating an optical fiber in a ferrule assembly and more particularly relates to a method and apparatus for supporting an end of an optical fiber in a ferrule assembly in a manner which enhances the optical

BACKGROUND OF THE INVENTION

The need for precision components in the area of optical fiber termination and connection assemblies is well known In connecting an optical fiber to a second fiber or another optical component, it is essential to provide a close tolerance alignment between the two components. In the special case of connecting two optical fibers, various fundamental factors affect the quality and reliability of the connection. These factors include quality of the end face of the fibers which are to be connected, the alignment of two fiber cores and the relative proximity of the end faces of the fibers which are connected.

Various techniques exist for preparing the end face of an optical fiber. These techniques include either scoring and breaking the fiber or grinding and polishing the fiber down to a flat end face. Each of these techniques attempts to provide a fiber end face which is substantially perpendicular to the axis of the fiber and is relatively free from dirt and debris, which would reduce the optical transmissive capabilities of the end face. Several tools and fixtures are available to prepare a fiber end face.

The efficiency of the connection is also affected by the accuracy with which the fibers are aligned. Greater optical efficiency is achieved when the fiber end faces are brought into close proximity. More importantly, however, is the accuracy of the core alignment, that is the accuracy with which the central axis of the fiber cores are aligned. Numerous fixtures are available which precisely support a pair of optical fibers in a position where the cores of the fibers are aligned. A typical fixture of this type includes an alignment member which accommodates prepared fiber ends from opposite sides thereof. The alignment member has a precision central bore therethrough which accommodates both of the fiber ends. The fibers may be then brought into abutting engagement to provide precise alignment. Alignment members of this type may take the form of a plurality of balls or rods which support the optical fiber in the intersticial space formed therebetween.

The art has also seen the use of additional or secondary alignment surfaces which aid in aligning the fibers and also provide a suitable structure for ease of handling. Secondary alignment elements include optical fiber ferrules which have precision apertures therethrough which accommodate the ends of optical fibers. These fiber ferrules may then be brought into contact with one another within the primary alignment member to dispose the end faces of the fibers in close proximity. One benefit of using a secondary alignment element such as a fiber ferrule is that the fiber may be supported initially in the ferrule and then fiber end face preparation may take place. This provides for ease of handling and connection. Since once prepared, the bare fiber need not be handled directly, the chances of damage are reduced. Thus, a fiber may be inserted into a fiber ferrule and then scored adjacent the egressing end thereof to provide a fiber end face thereat. This end face may then be further prepared by grinding and polishing to make it flush with the egressing end of the ferrule.

One problem which has arisen with the technique of breaking the fiber and polishing the end face is that when the fiber is scored in the ferrule, quite often the crack propragation of the fiber may be toward the egressing end of the ferrule. If the fiber was to crack or break within the ferrule, the end face of the fiber could not be polished down to a perpendicular end face. Thus the fiber would have to be reterminated in another fiber ferrule.

In addition, problems may arise where the material with which the fiber ferrule is formed is incompatible with the fiber itself. A plastic fiber ferrule formed of a material softer than the fiber may present a problem when an attempt is made to grind and polish the end face of the fiber flush with the ferrule itself. Damage could be done to the ferrule which may cause problems in terminating two ferrules together. Similarly, a fiber ferrule formed of a material harder than the glass fiber, such as ceramic, may cause further problems during grinding and polishing. The fiber itself may be ground and polished below the end face of the ceramic ferrule thereby causing a gap between two fibers upon mating. Gaps such as these reduce the optical efficiency of the connection.

It is therefore desirable to provide an improved optical fiber support element which will support a optical fiber and provide for fiber end face preparation which avoids disadvantages of past practices.

SUMMARY OF THE INVENTION

It is an object of the present invention to provide an improved optical fiber ferrule which accommodates an optical fiber and provides a prepared optical fiber end face exteriorly of the ferrule.

It is a further object of the present invention to provide a ferrule assembly which accommodates an optical fiber and disposes a supported prepared end face at a location spaced from the end of the ferrule.

It is a still further object of the present invention to provide a ferrule assembly which includes a fiber support member being formed of a material similar to that of the fiber, which when ground and polished, will provide a uniform flat end face thereby enhancing connection capabilities.

In the efficient attainment of the foregoing and other objects, the present invention looks toward providing a method and apparatus for supporting an optical fiber in a ferrule assembly.

The optical fiber ferrule assembly includes an elongate ferrule body having a fiber insertion end, a fiber egressing end and an elongate bore therebetween. The ferrule body accommodates an elongate fiber support capillary therein. The support capillary has a precision aperture extending therethrough which accommodates the fiber therealong. The support capillary further provides a first end extent which extends beyond the fiber egressing end of the ferrule. The support capillary is formed of a material having a hardness substantially similar to that of the optical fiber so that the optical fiber and the support capillary may be ground and polished together to form a substantially flat end face.

In the method aspect of the present invention, a method of terminating an elongate optical fiber is provided. The method includes disposing an elongate capillary into an optical fiber ferrule. A fiber is then inserted into a precision aperture in the capillary. An end of the fiber as well as a portion of the capillary extend beyond the end face of the ferrule. The fiber is then cleaved adjacent the end of the capillary. The fiber as well as the capillary are ground and polished to form a uniform substantially flat end surface.

DETAILED DESCRIPTION OF THE PREFERRED EMBODIMENT

Figure 1:
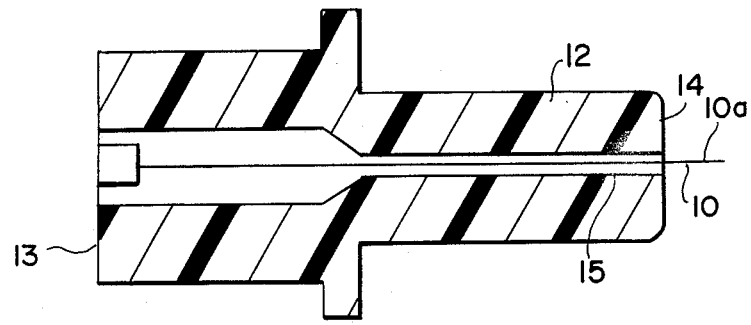
FIG. 1 is a sectional showing of a typical ferrule used to support an optical fiber for connection purposes.

Referring now to FIG. 1, an optical fiber 10 used in conjunction with the present invention typically includes an elongate member having a concentric core and cladding (not shown). Fiber 10 may be formed of plastic or glass. The present invention finds particular utility when used with a glass fiber. In order to connect one fiber 10 to a second fiber or to another optical element, the fiber is supported in a conventional optical fiber ferrule 12. A fiber ferrule of this type is an elongate member including a fiber insertion end 13, a fiber egressing end 14 and a central bore 15 extending therethrough. The fiber 10 is inserted into the bore 15 through the insertion end 13 so that an end 10a thereof extends beyond egressing end 14. The end 10a may then be prepared so that the fiber 10 may be connected to another optical element. The end 10a is typically prepared by cleaving and/or grinding or polishing the end face flush with the fiber egressing end 14 of ferrule 12.

Figure 2:
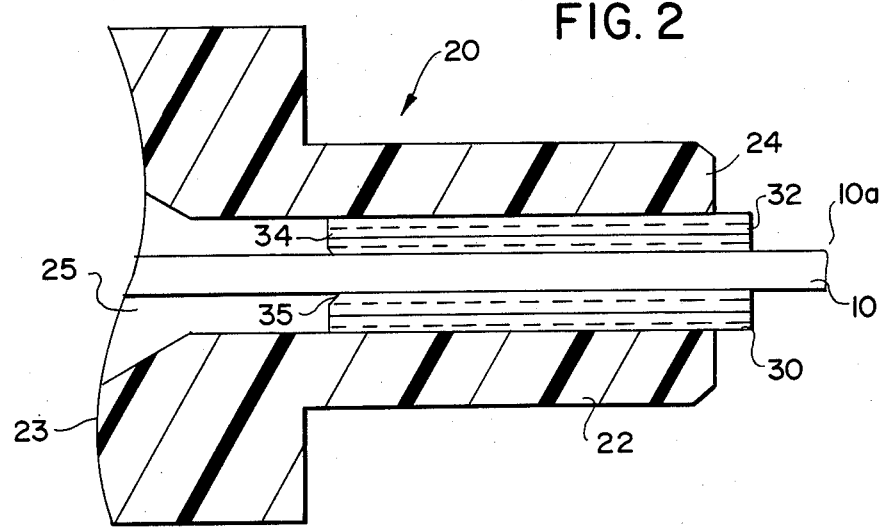
FIG. 2 is an enlarged sectional showing of the improved ferrule assembly of the present invention used to terminate an optical fiber.

An improved fiber ferrule assembly of the present invention is shown in FIG. 2. Ferrule assembly 20 includes a ferrule body 22 having a fiber insertion end 23, a fiber egressing end 24, and a central longitudinal bore 25 extending therebetween. In the present illustrative embodiment, ferrule body 22 is formed of plastic material such as a liquid crystal polymer; however it is understood that any other suitable material may also be used to form ferrule body 22.

Supported in central bore 25 of ferrule body 22 is a precision capillary 30. Capillary 30 is an elongate tubular member having a first end 32 adjacent the fiber egressing end 24 of ferrule body 22 and a second end 34 adjacent the fiber insertion end 23 of ferrule body 22. A precision aperture 35 extends between ends 32 and 34 of capillary 30. Capillary 30 is formed of a glass material similar to the glass material which forms fiber 10. The glass capillary 30 is formed by a drawing process in which the precision central aperture 35 is formed along with the capillary itself during the drawing process. The aperture 35 has a diameter which closely approximates the outer diameter of the optical fiber 10 which is to extend therethrough.

As shown in FIG. 2, the capillary 30 is disposed internally of ferrule body 22 forming ferrule assembly 20. During formation of ferrule assembly 20, the capillary 30 is supported in a mold fixture (not shown) and the plastic ferrule body 22 is injection molded therearound. Thus glass capillary 30 is molded in a fixed position within the bore 25 of ferrule body 22. The capillary 30 is positioned such that end 32 extends beyond fiber egressing end 24 of ferrule body 22. The fiber 10 is then inserted into the aperture 35 of capillary 30 through the insertion end 23 of ferrule body 22. The fiber is extended entirely through aperture 35 so that the end 10a of fiber 10 extends beyond the first end 32 of capillary 30. The fiber 10 is then fixedly positioned in the ferrule body 22 in a manner well known in the art. An epoxy adhesive or other fastener (not shown) may be used. The fiber 10 will be fixedly positioned not only with respect to ferrule body 22, but also with respect to capillary 30 which is fixedly positioned in the ferrule body 22. As above mentioned, aperture 35 is closely dimensioned to the outside dimension of fiber 10. As capillary 30 is an elongate member, having a length approximately 10 mm, the fiber 10 will be continuously supported along a longitudinal extent thereof. The fiber 10 will thus be axially positioned with respect to ferrule body 22. The longitudinal axis of fiber 10 will be aligned with the longitudinal axis of ferrule body 22.

Once the fiber 10 is supported in ferrule body 22, the end face 10a of the fiber 10 may be prepared.

Figure 3:
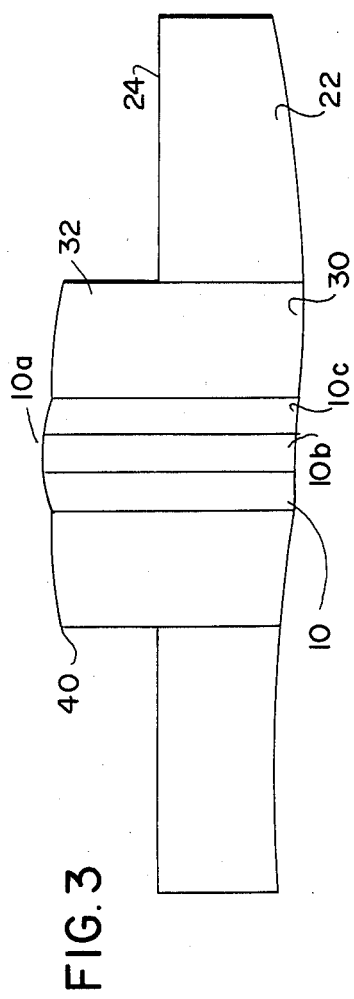
FIG. 3 is an enlarged sectional showing of an end face of an optical fiber supported in the ferrule assembly of FIG. 2.

FIG. 3 shows a greatly enlarged view of fiber end 10a prepared in accordance with the present invention. The fiber 10 may be cleaved adjacent the end 32 of capillary 30. A conventional cleaving tool (not shown) may be used. The fiber is typically scored to initiate a crack and broken at the score line, leaving a rough end 10a. The fiber end 10a as well as first end 32 of capillary 30 is then ground and polished in a manner well known in the optical fiber art. Since the first end 32 of capillary 30 extends beyond the egressing end 24 of ferrule body 22, a greater tolerance for crack propragation is permitted. Even if the crack made by the cleaving tool were to propragate from the score line inwardly of the end 32 of capillary 30, a sufficient polishing extent is provided so that a perpendicular end face may be formed. As capillary 30 is formed of a glass material similar to that of fiber 10, it will be uniformly ground and polished together to form a substantially flat uniform end surface 40. It can be seen that the polishing of the end surface 40 is achieved at a position spaced substantially from the egressing end 24 of ferrule 22. During the polishing process there is no contact with the egressing end 24 of ferrule body 22. This avoids any abrasion to the ferrule body as only the glass capillary 30 and the glass fiber are ground and polished.

In one polishing technique, the fiber as well as the ferrule assembly 20, is inserted into a fixture wherein a polishing plate is supported on a hard support surface. Grinding and polishing using a fixture such as this would provide substantially flat end face where the glass capillary 30 and the fiber end 10a will be ground in unison to achieve a uniform perpendicular end face. In a second polishing technique a polishing plate may be supported on a softer support surface. As the optical fiber 10 is typically formed of a glass material which has a hardness slightly greater than the hardness of the glass capillary 30, some bowing or curvature will occur as during polishing on a soft surface, the glass capillary 30 will wear faster than fiber 10 especially the core 10b thereof. The core 10b of the fiber may be raised further above both the cladding 10c and the glass capillary 30. Thus the fiber 10 will present a slightly raised rounded surface.

This slightly bowed profile as shown in FIG. 3 will increase optical efficiency between connected fibers as only the cores 10b will come in contact during connection as will be described in detail hereinbelow with reference to FIG. 4. However, this rounding is very slight and virtually undetectable to the untrained eye. While some rounding of the fiber core may be achieved with certain polishing techniques and would be beneficial, it is the substantially uniform flat end surface 40 that is provided by either polishing technique that provides a high degree of optical efficiency.

Figure 4:
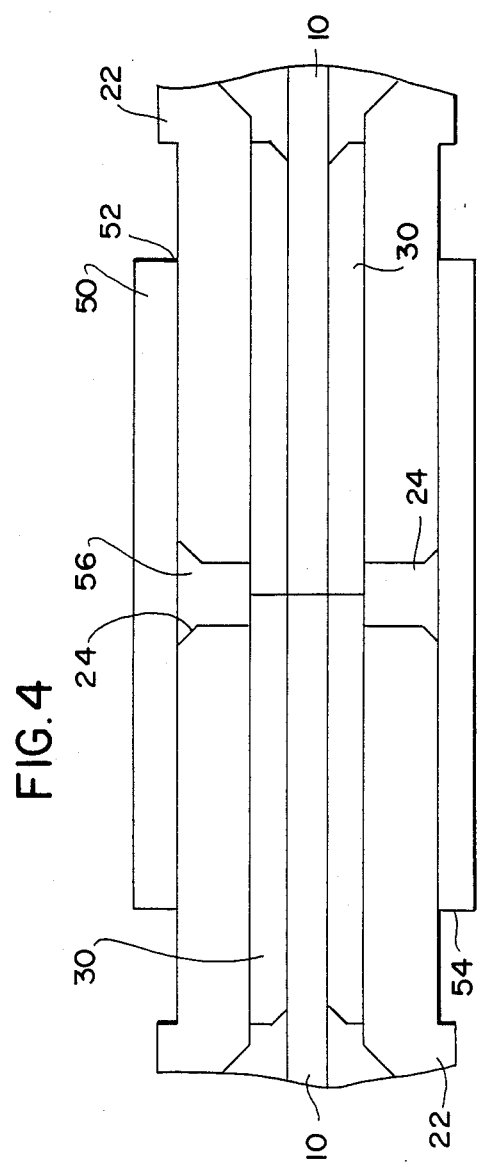
FIG. 4 is a sectional showing of a pair of connected optical fibers each supported in a ferrule assembly of the present invention.

Referring now to FIG. 4, a pair of ferrule assemblies 20 of the present invention are supported in an alignment sleeve 50 to facilitate connection. Alignment sleeve 50 is a cylindrical member having opposed ends 52 and 54 and a central channel 56 therebetween. A first ferrule assembly 20 of the type above described, is inserted in one end of the alignment sleeve 50 and a second ferrule assembly 20 is inserted through the other end. The ferrule assemblies 20 are progressed until the prepared end surfaces 40 of the respective capillaries 30 are placed in abutting contact. The optical fibers 10 will therefore be similarly placed in abutting contact with the cores 10b (FIG. 3) of the fibers being in axial alignment. As the capillary ends 32 extend beyond the fiber egressing ends 24 of the ferrule bodies 22, the fiber egressing ends 24 will not come in contact. Only the polished and prepared end surfaces 40 are placed in direct contact. Connection of the fibers 10 are made by direct surface-to-surface contact, rather than by contact of the respective ferrule bodies 22. This direct contact increases the quality of the connection.

Various changes to the foregoing described and shown structures would now be evident to those skilled in the art. Accordingly, the scope of the invention is set forth in the following claims.

I claim:

1. A ferrule assembly for supporting an elongate optical fiber comprising:
   an elongate molded plastic optical fiber ferrule body having a fiber insertion end, a fiber egressing end, an elongate interior bore extending axially therebetween and an exterior surface for providing engageable alignment with an interior surface of a ferrule coupling device; and
   an elongate capillary directly supported in said bore contiguously with said body, said capillary having a precision aperture extending therethrough for supporting said fiber therealong;
   said capillary further including a first end extent which extends beyond said fiber egressing end of said body; said capillary further being formed of a material having a hardness substantially similar to that of said optical fiber;
   said capillary first end extent defining an unpolished end surface longitudinally spaced from said fiber egressing end of said body whereby said end surface is capable of being optically polished in a manner excluding contact with said body.

2. A ferrule of claim 1 wherein said capillary is fixedly positioned in said bore of said body.

3. A ferrule of claim 2 wherein said fiber is positionable in said body through said fiber insertion end in fixed position with respect to said capillary.

4. A ferrule of claim 3 wherein said body is formed of a material dissimilar to that of said capillary.

5. A ferrule of claim 4 wherein said optical fiber is a glass fiber.

6. A ferrule of claim 5 wherein said capillary first end extent and an end of said fiber are spaced outwardly from said fiber egressing end of said body.

7. A connector ferrule assembly for supporting an elongate optical fiber, said assembly comprising:
   an elongate capillary having a first longitudinal end, a second longitudinal end spaced therefrom and a precision bore longitudinally extending therethrough for providing passage of said fiber;
   an elongate ferrule body formed of plastic material having a first end, a second end, a longitudinal interior passage therethrough and an exterior alignment surface for engageable alignment with an interior surface of a ferrule coupling device, said ferrule body being molded around said capillary to self-adheringly support said capillary in said passage thereof, said first end of said capillary being adjacent said first end of said ferrule body.

8. A connector of claim 7 wherein said capillary is formed of glass.

9. A connector of claim 7 wherein said ferrule body is formed of injection-molded plastic.

10. A connector of claim 7 wherein said second end of said capillary is disposed between said first and second ends of said ferrule body.

* * * * *

UNITED STATES PATENT AND TRADEMARK OFFICE
CERTIFICATE OF CORRECTION

PATENT NO. : 4,815,809

DATED : March 28, 1989

INVENTOR(S) : Tadeusz Szostak

It is certified that error appears in the above-identified patent and that said Letters Patent is hereby corrected as shown below:

On cover page, after the word "Assignee:", delete "Robert M. Rodrick, Bridgewater, NJ" and insert --Thomas & Betts Corporation, Bridgewater, NJ.--

In column 1, line 11, after the word "optical" the following should be inserted --transmissive capabilities of the terminated fiber.--

In column 1, line 16, after "known" insert a period --.--.

In column 1, line 53, "intersticial" should be --interstitial--.

In column 2, line 1, after the word "directly" delete a comma ",".

In column 2, line 10, "propragation" should be --propagation--.

In column 4, line 40, "propragation" should be --propagation--.

In column 4, line 42, "propragate" should be --propagate--.

Signed and Sealed this

Seventh Day of November, 1989

*Attest:*

JEFFREY M. SAMUELS

*Attesting Officer*     *Acting Commissioner of Patents and Trademarks*